US011200191B2

(12) United States Patent
Eun

(10) Patent No.: US 11,200,191 B2
(45) Date of Patent: Dec. 14, 2021

(54) USB C TYPE-BASED INPUT/OUTPUT EXPANSION BOX FOR POS DEVICE

(71) Applicant: POSBANK CO., LTD, Seoul (KR)

(72) Inventor: Dong Uk Eun, Gwangmyeong (KR)

(73) Assignee: POSBANK CO., LTD, Seoul (KR)

( * ) Notice: Subject to any disclaimer, the term of this patent is extended or adjusted under 35 U.S.C. 154(b) by 0 days.

(21) Appl. No.: 16/982,298

(22) PCT Filed: Mar. 27, 2019

(86) PCT No.: PCT/KR2019/003564
§ 371 (c)(1),
(2) Date: Sep. 18, 2020

(87) PCT Pub. No.: WO2019/190191
PCT Pub. Date: Oct. 3, 2019

(65) Prior Publication Data
US 2021/0019271 A1  Jan. 21, 2021

(30) Foreign Application Priority Data
Mar. 28, 2018 (KR) .................. 10-2018-0035850

(51) Int. Cl.
*G06F 1/26* (2006.01)
*H05K 7/14* (2006.01)
*G06F 13/40* (2006.01)

(52) U.S. Cl.
CPC ........ *G06F 13/409* (2013.01); *G06F 13/4068* (2013.01); *G06F 1/266* (2013.01)

(58) Field of Classification Search
CPC .... G06F 13/409; G06F 13/4068; G06F 1/266; G06F 13/38; G06F 1/26
See application file for complete search history.

(56) References Cited

U.S. PATENT DOCUMENTS

| | | | |
|---|---|---|---|
| 2005/0215091 A1* | 9/2005 | Rossi | G06F 1/185 439/76.1 |
| 2014/0334089 A1* | 11/2014 | Schade | G06F 13/387 361/679.32 |
| 2017/0364465 A1* | 12/2017 | Tsukamoto | G06F 13/4022 |
| 2018/0250587 A1* | 9/2018 | Strahle | A63F 13/25 |
| 2018/0314661 A1* | 11/2018 | Douthat | G06F 13/4282 |

FOREIGN PATENT DOCUMENTS

| | | |
|---|---|---|
| JP | 2004030315 A | 1/2004 |
| JP | 2017224261 A | 12/2017 |
| KR | 101697069 B1 | 1/2017 |
| KR | 1020180007085 A | 1/2018 |
| KR | 101826345 B1 | 2/2018 |

\* cited by examiner

*Primary Examiner* — Idriss N Alrobaye
*Assistant Examiner* — Ronald T Modo
(74) *Attorney, Agent, or Firm* — Patentfile, LLC; Bradley C. Fach; Steven R. Kick

(57) ABSTRACT

The present invention has an advantage in that both power supply to a POS device and USB communication can be simultaneously performed through one USB C type cable.

1 Claim, 5 Drawing Sheets

USB C TYPE-BASED INPUT/OUTPUT EXPANSION BOX FOR POS DEVICE

This Application is a 35 U.S.C. 371 National Stage Entry of International Application No. PCT/KR2019/003564 filed on Mar. 27, 2019, which claims the benefit of Republic of Korea Patent Application No. 10-2018-0035850, filed on Mar. 28, 2018, the entire disclosures of which are incorporated by reference herein.

BACKGROUND OF THE DISCLOSURE

Field of the Disclosure

The present disclosure relates to a universal serial bus (USB) C type-based input/output expansion box for a point of sales (POS) device and, more particularly, to a USB C type-based input/output expansion box for a POS device. The USB C type-based input/output expansion box includes a housing 110, a printed circuit board (PCB) unit 120 installed within the housing 110, a converter unit to which an external current is applied, a USB communication port 140 connected to a USB C type cable, supplying a power supply to a POS device 10, and connecting a transmission and reception of USB communication to and from the POS device 10, an Ethernet port 150 connected to an external communication network, a USB auxiliary port 160 connected to any one external device of a POS printer 20 or a barcode scanner 30, and a serial communication port 170 connected to a display unit 40 and outputting information.

Related Art

In general, a POS system indicative of a point of sales system has a POS terminal installed at a sales place, and synthetically manages logistic economy, such as market search, stock taking, and point of sales management, in addition to the office processing of sales.

That is, the POS system is a system in which a POS terminal having an electronic cash register function and computer function is provided at the checkout counter of a department store or a supermarket and data in sales management accompanied by the selling of a product (e.g., data to be used for the sales management, stock management, etc. of a product) is automatically collected and recorded at a point of sales.

A conventional cash register has a primary function for calculating customer's sales on the spot fast and accurately. In contrast, a current POS system can collect and process purchase and sales information of products, and rapidly searches for and manages various types of product information and accounting information using the purchase and sales information.

The POS terminal has a function such as a conventional cash register, a function for temporarily recording data, and a function for accessing a higher device and transmitting data of a point of sales to the higher device. The POS terminal receives a product code through a key input or a scanner and transmits the product code to the higher device.

An input/output (IO) expansion box is used for communication for information processing between a peripheral device, such as the higher device or a cash settlement device, a POS printer, a barcode scanner, an EMV terminal, or a display, and a POS device.

In general, the IO expansion box is an external device having an object of increasing connectable peripheral devices. The IO expansion box enables all tasks which may be performed in one POS device, that is, tasks for enabling data to be checked with the naked eye, enabling cash settlement, and enabling results to be printed.

Such an IO expansion box is disclosed through various embodiments. Among them, an "input and output port expansion device (Korean Utility Model Application Publication No. 1999-0035714)" in Patent Document 1 includes a microcomputer performing a central operation processing function and including an address data (AD) port from which an address and data are output, an address latch enable (ALE) port for latching an address, a program strobe enable (PSEN) port for transmitting data, a read (RD) port for outputting a read signal, and a write (WR) port for outputting a write signal; a latch unit controlled in response to an enable signal output from the ALE port of the microcomputer, for temporarily storing an address output from the AD port; a memory unit receiving a PSEN signal from the microcomputer and including a data (D) port and an address (A) port for reading data output by the microcomputer and an address output by the latch unit; an expansion input unit controlled by the RD port of the microcomputer, connected to a bus (line) that connects the AD port of the microcomputer and the D port of the memory unit, and implementing an expansion input port for receiving an external command from an input device; and an expansion output unit controlled in response to a signal from the WR port of the microcomputer, connected to the bus that connects the AD port of the microcomputer and the D port of the memory unit, and implementing an expansion output port for outputting internal data to the external output device. The input and output port expansion device has an advantage in that the input and output ports can be expanded as many as it is desired.

However, the "input and output port expansion device" in Patent Document 1 has a configuration to which a signal connection method through a USB port is not applied, has elements, such as a system for transmitting an output signal and a system for applying power, separately formed, and has complicated elements.

SUMMARY OF THE DISCLOSURE

The present disclosure provides a USB C type-based input/output expansion box for a POS device, wherein both power supply to a POS device and USB communication can be simultaneously performed through a single USB C type cable.

Furthermore, the present disclosure provides a USB C type-based input/output expansion box for a POS device, which can connect various peripheral devices through a single device by configuring multiple USB auxiliary ports.

Furthermore, the present disclosure provides a USB C type-based input/output expansion box for a POS device, wherein a back attachment and detachment cover is further positioned at the back of a housing in order to prevent a connection portion of connection cables connected to a USB auxiliary port and a serial communication port from being exposed to the outside and thus to prevent an error or failure between device connections due to an alien substance caught in the connection portion.

In an aspect, a universal serial bus (USB) C type-based input/output expansion box for a point of sales (POS) device includes a housing 110, a printed circuit board (PCB) unit 120 installed within the housing 110, a converter unit to which an external current is applied, a USB communication port 140 connected to a USB C type cable, supplying a power supply to a POS device 10, and connecting a transmission and reception of USB communication to and from the POS device 10, an Ethernet port 150 connected to an external communication network, a USB auxiliary port 160 connected to any one external device of a POS printer 20 or a barcode scanner 30, and a serial communication port 170 connected to the display unit 40 and outputting information.

Furthermore, the converter unit is configured as any one of an AC/DC converter or a DC/DC converter.

Furthermore, a plurality of the USB auxiliary ports 160 and a plurality of the serial communication ports 170 are formed.

Furthermore, the USB auxiliary port 160 and the serial communication port 170 are disposed at a back side of the housing 110.

Furthermore, a back attachment and detachment cover 180 for preventing a connection portion of connection cables 60 connected to the USB auxiliary port 160 and the serial communication port 170, respectively, from being externally exposed is positioned at a back of the housing 110.

DESCRIPTION OF EXEMPLARY EMBODIMENTS

Figure 1:
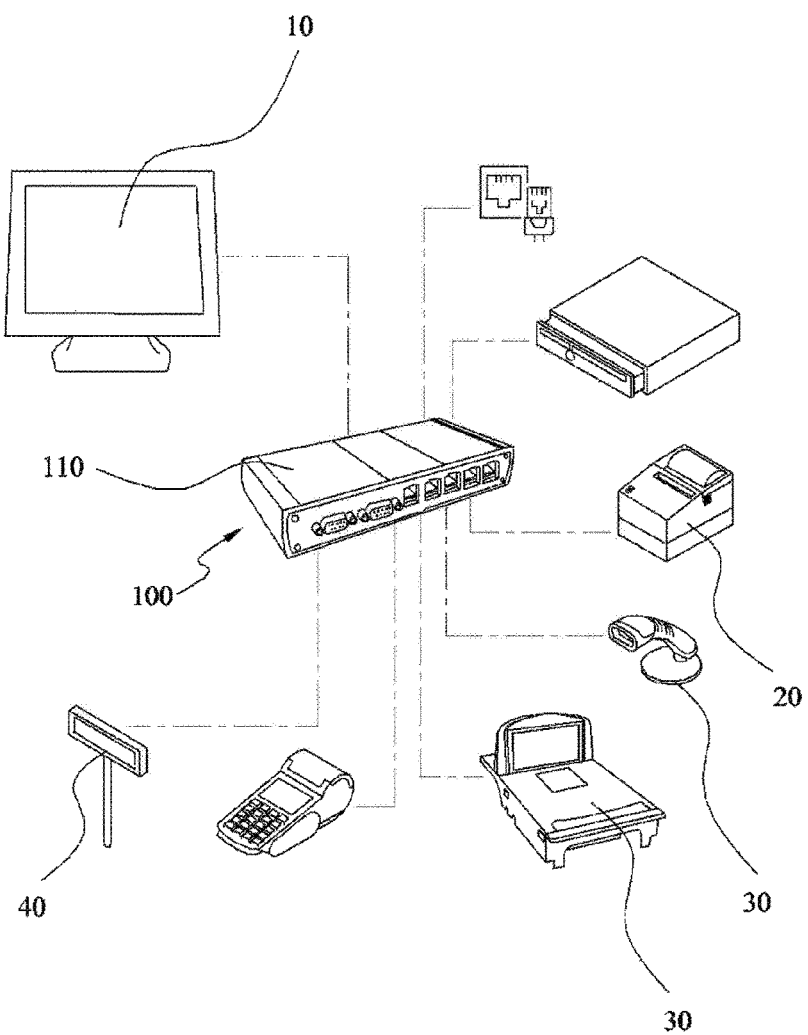
FIG. 1 is a concept view illustrating external devices connected to a USB C type-based input/output expansion box for a POS device according to an embodiment of the present disclosure.

Hereinafter, a USB C type-based input/output expansion box 100 for a POS device according to an embodiment of the present disclosure is described in detail with reference to the accompanying drawings. First, it is to be noted that in the drawings, the same elements or parts are indicated using the same reference numeral as much as possible. In describing the present disclosure, a detailed description of a related known function or configuration will be omitted in order to avoid making the gist of the present disclosure obscure.

Referring to FIGS. 1 to 4, the USB C type-based input/output expansion box 100 for a POS device according to an embodiment of the present disclosure basically includes a housing 110, a printed circuit board (PCB) unit 120, and a back attachment and detachment cover 180.

Figure 4:
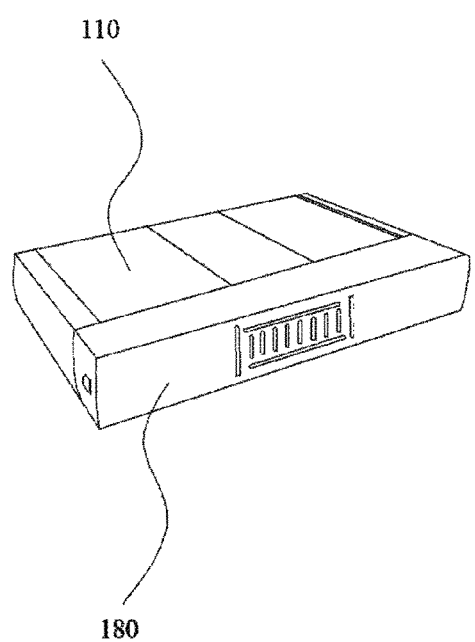
FIG. 4 is a perspective view illustrating the state in which a back attachment and detachment cover is connected to the USB C type-based input/output expansion box for a POS device according to an embodiment of the present disclosure.

First, the housing 110 is described. As illustrated in FIG. 1 or 4, the housing 110 refers to a kind of external box, and has the PCB unit 120 positioned therein.

Exposure holes (not illustrated) through which a USB communication port 140, an Ethernet port 150, USB auxiliary ports 160, and a serial communication port 170 are exposed to the outside and connected to connection cables 60, respectively, are perforated and formed at the front side and back side of the housing 110.

Figure 5:
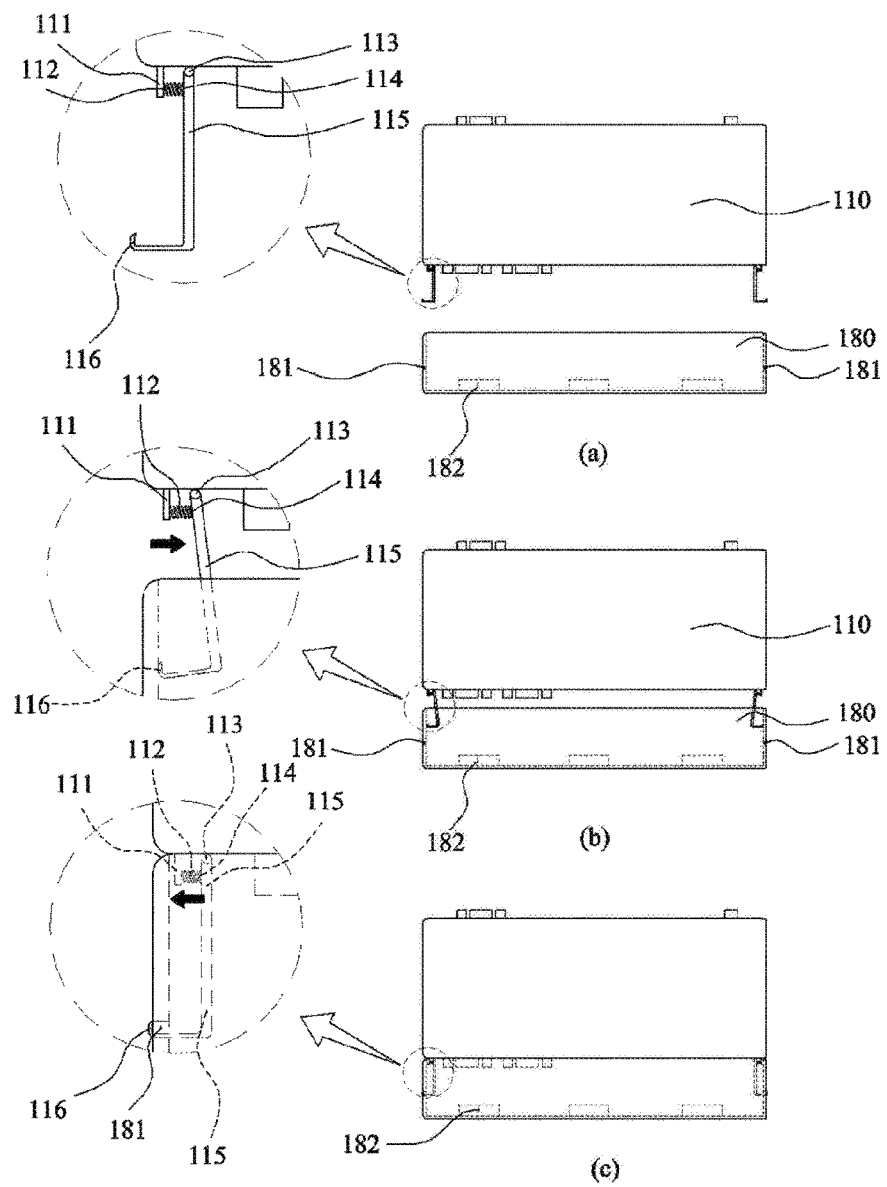
FIG. 5 is an embodiment illustrating a process of connecting the back attachment and detachment cover to the USB C type-based input/output expansion box for a POS device according to an embodiment of the present disclosure.

In an embodiment of the present disclosure, as illustrated in FIG. 5, a support 111, an elastic member 112, a hinge part 113, a fixing protrusion 114, a latch pin 115, and a hitch protrusion 116 may be further formed in the housing 110.

Prior to a description, the elements, that is, the support 111, the elastic member 112, the hinge part 113, the fixing protrusion 114, the latch pin 115, and the hitch protrusion 116, are elements which enable the back attachment and detachment cover 180 to be attached to or detached from the back side of the housing 110. It is to be noted that two sets of the elements are symmetrically formed at the back side of the housing 110.

The support 111 is protruded at the back of the housing 110, and functions to fix one side of the elastic member 112.

The elastic member 112 is positioned between the support 111 and the latch pin 115, and applies an elastic force to the latch pin 115. In general, a spring is used as the elastic member 112.

The elastic member 112 maintains a compression state at normal times. In a process of coupling the back attachment and detachment cover 180 to the back side of the housing 110, the state of the elastic member 112 changes to an extension state. In the state in which the back attachment and detachment cover 180 has been coupled to the back side of the housing 110, that is, when the hitch protrusion 116 is inserted into a hitch groove 181, the elastic member 112 maintains the compression state again.

The hinge part 113 is a kind of hinge formed at the back of the housing 110. The hinge part 113 is coupled to the latch pin 115 and enables the latch pin 115 to be rotated around the hinge part 113.

The latch pin 115 is coupled to the hinge part 113 and rotated around the hinge part 113. The latch pin 115 is rotated in the state in which the rotation range of the latch pin 115 is limited by the elastic member 112. When the back attachment and detachment cover 180 is coupled to the back side of the housing 110, the latch pin 115 functions to fix the back attachment and detachment cover 180. The fixing protrusion 114 is formed on the outside of the latch pin 115 and coupled to the other side of the elastic member 112. Accordingly, the latch pin 115 prevents the elastic member 112 from being detached to the outside between the support 111 and the latch pin 115.

Furthermore, the hitch protrusion 116 having a hook shape is formed at the front end of the latch pin 115. When the back attachment and detachment cover 180 is coupled to the back side of the housing 110, the hitch protrusion 116 is inserted into the hitch groove 181 and functions to fix the back attachment and detachment cover 180.

In this case, the edge parts of the hitch protrusion 116 may be formed with a smooth slope.

Accordingly, in a process of coupling the back attachment and detachment cover 180 to the back side of the housing 110, when the latch pin 115 comes into contact with the inside of the back attachment and detachment cover 180, the state of the elastic member 112 initially having a compression state changes to an extension state. The latch pin 115 is rotated around the hinge part 113 and thus widened. When the coupling of the back attachment and detachment cover 180 to the back side of the housing 110 is completed, the state of the elastic member 112 having the extension state returns to the initial compression state as the hitch protrusion 116 is inserted into the hitch groove 181. Accordingly, the hitch protrusion 116 is caught in the hitch groove 181.

In order to separate the back attachment and detachment cover 180 from the housing 110, the hitch protrusion 116 is pressed using a needle or pointed means and the back attachment and detachment cover 180 is pulled.

Figure 2:
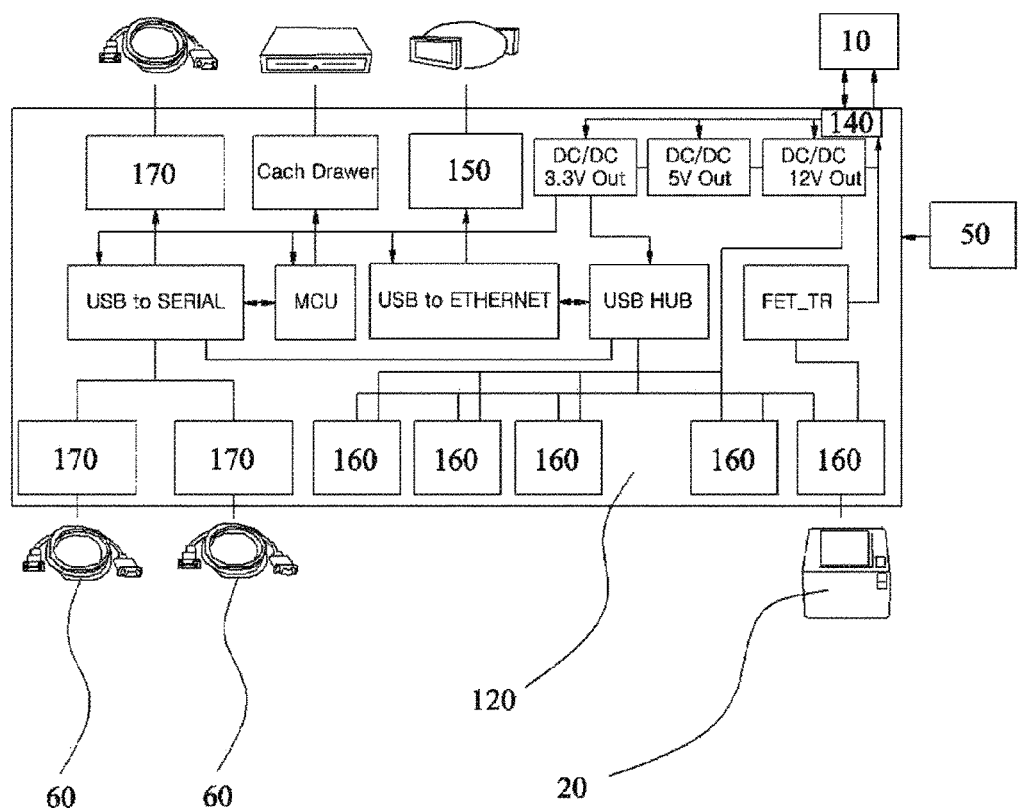
FIG. 2 is a diagram illustrating the circuit configuration of the USB C type-based input/output expansion box for a POS device according to an embodiment of the present disclosure.

The PCB unit 120 is described below. As illustrated in FIG. 2, the PCB unit 120 is a kind of circuit board installed within the housing 110.

In addition to a MCU, a CPU, and a USB hub, a converter unit to which an external current is applied, the USB communication port 140 connected to a universal serial bus USB C type cable, supplying a power supply to a POS device 10, and connecting the transmission and reception of USB communication to and from the POS device 10, the Ethernet port 150 connected to an external communication network, the USB auxiliary port 160 connected to any one external device of a POS printer 20 or a barcode scanner 30, and the serial communication port 170 connected to a display unit 40 and outputting information are formed in the PCB unit 120.

Any one of an AC/DC converter or a DC/DC converter may be used as the converter unit. A plurality of the USB auxiliary ports 160 and the serial communication ports 170 may be formed.

Furthermore, the USB auxiliary port 160 and the serial communication port 170 may be disposed at the back side of the housing 110.

Through such a configuration, a power supply can be supplied to the POS device 10 and simultaneously USB communication can be performed through a single USB C type cable by the USB communication port 140 connected to a universal serial bus (USB) C type cable.

Furthermore, although separate power supplies are not supplied to the POS printer 20 and a peripheral device, the power supply can be supplied by the converter unit connected to the PCB unit 120.

Figure 3:
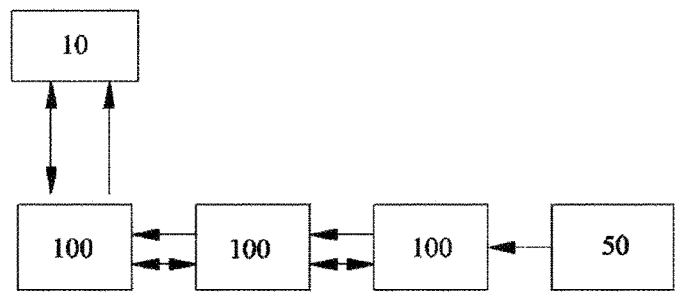
FIG. 3 is a diagram illustrating the state in which multiple USB C type-based input/output expansion boxes for a POS device according to an embodiment of the present disclosure are connected.

Furthermore, as illustrated in FIG. 3, if several USB C type-based input/output expansion boxes 100 for a POS device according to an embodiment of the present disclosure are used, a port shortage phenomenon can be solved.

The back attachment and detachment cover 180 is described. As illustrated in FIG. 4 or 5, the back attachment and detachment cover 180 is detachable from the back side of the housing 110, and functions to prevent a connection portion of the connection cables 60, connected to the USB auxiliary port 160 and the serial communication port 170 positioned at the back side of the housing 110, respectively, from being exposed to the outside. The hitch groove 181 into which the hitch protrusion 116 is inserted is perforated on both sides of the back attachment and detachment cover 180.

Multiple connection cable through holes 182 through which the wire portion of the connection cable 60 is exposed to the outside and connected to other peripheral devices may be perforated at the bottom of the back attachment and detachment cover 180.

As described above, according to the present disclosure, there is an advantage in that a power supply can be supplied to the POS device and simultaneously USB communication can be performed through a single USB C type cable.

Furthermore, there is an advantage in that various peripheral devices can be connected through a single device by configuring multiple USB auxiliary ports.

Furthermore, the back attachment and detachment cover is further positioned at the back of the housing. Accordingly, there is an advantage in that a connection portion of connection cables connected to the USB auxiliary port and the serial communication port can be prevented from being exposed to the outside and thus an error or failure between device connections can be prevented due to an alien substance caught in the connection portion.

The best embodiments have been disclosed in the drawings and specification. Specific terms have been used herein, but the terms are used to only describe the present disclosure, but are not used to limit the meaning of the terms or the scope of rights of the present disclosure written in the claim. Accordingly, those skilled in the art will understand that various modifications and other equivalent embodiments are possible from the embodiments. Accordingly, the true technical range of protection of the present disclosure should be determined by the technical spirit of the following claims.

What is claimed is:

1. A universal serial bus (USB) C type-based input/output expansion box for a point of sales (POS) device, comprising:
a housing having a front side and a back side;
a printed circuit board (PCB) unit installed within the housing;
a converter unit to which an external current is received and wherein the converter unit is configured as any one of an AC/DC converter or a DC/DC converter;
a USB communication port configured to connect to a USB C type cable, supplying a power supply to a POS device, and connecting a transmission and reception of USB communication to and from the POS device;
an Ethernet port configured to connect to an external communication network;
a plurality of USB auxiliary ports located on the back side of the housing wherein at least one USB auxiliary port of the plurality of USB auxiliary ports configured to connect to one of; a printer or a scanner;
a plurality of serial communication ports located on the back side of the housing wherein at least one serial communication port of the plurality of serial communication ports configured to connect to a display unit for outputting information;
a back attachment and detachment cover removably coupled to the back side of the housing, the back attachment and detachment cover comprising a hitch groove;
a support protruding from the back side of the housing;
a hinge part positioned at the back side of the housing and proximate to the support;
a latch pin coupled to the hinge part so that the latch pin is configured to rotate relative to the housing;
a hitch protrusion is formed at a front end of the latch pin;
an elastic member positioned between the support and the latch pin to provide an elastic force between the support and the latch pin;
wherein the back attachment and detachment cover is removably coupled to the back side of the housing by inserting the hitch protrusion from the latch pin into the hitch groove in the back attachment and detachment cover.

* * * * *